Jan. 13, 1970     F. W. TIMS, JR     3,488,843
HAND CUTTING TOOL WITH MEANS TO SUPPORT A PLURALITY OF BLADES
AND MEANS TO HOLD A SINGLE BLADE IN A CUTTING POSITION
Filed Nov. 15, 1967
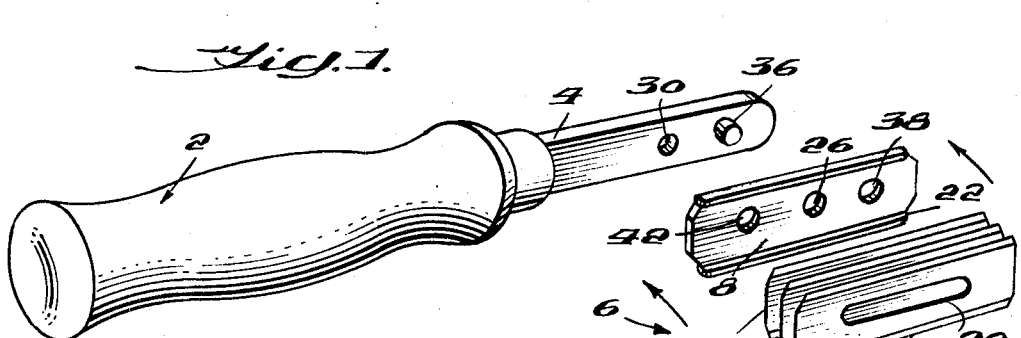
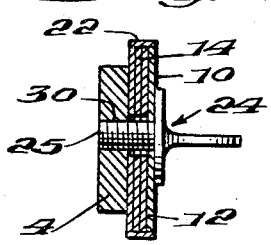
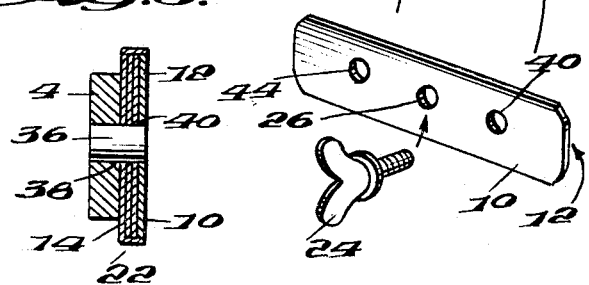
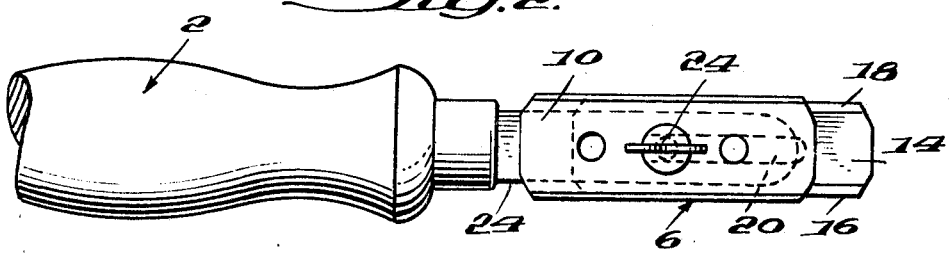
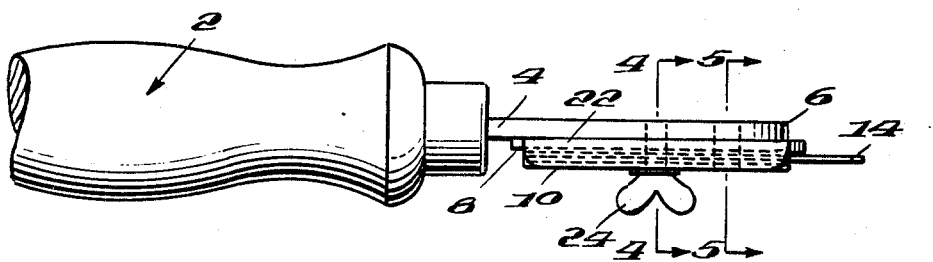
INVENTOR
FRED W. TIMS, JR.
BY Burns, Doane, Benedict, Swecker & Mathis
ATTORNEYS 3,488,843
HAND CUTTING TOOL WITH MEANS TO SUPPORT A PLURALITY OF BLADES AND MEANS TO HOLD A SINGLE BLADE IN A CUTTING POSITION
Fred W. Tims, Jr., Stratford, Conn., assignor to The Camson Manufacturing Company, West Haven, Conn., a corporation of Connecticut
Filed Nov. 15, 1967, Ser. No. 683,235
Int. Cl. B26b 5/00
U.S. Cl. 30—162                            6 Claims

ABSTRACT OF THE DISCLOSURE

A hand cutting tool has a handle connected to a blade holder adapted to hold a plurality of replaceable, thin, flat cutting blades. The blade holder includes cooperating, first and second jaw members defining a channel adapted to receive the blades in stacked, side by-side relation extending longitudinally of the channel. Releasable first connecting means fixedly connecting the first and second jaw members together to clamp the blades may be partially released to permit each of the blades to be selectively advanced longitudinally outward of the channel into the cutting position one at a time.

BACKGROUND OF INVENTION

This invention relates to a hand cutting tool having a blade holder adapted to receive a plurality of replaceable, thin, flat cutting blades.

In cutting material by hand it is often convenient to use a hand cutting tool provided with a detachable blade which may be removed when it becomes blunted and replaced by a fresh, sharp blade. Among other uses, these tools are commonly used in interior decoration for the purposes of wallpaper cutting, paint removal and the like.

Hand tools of this type, as shown for example in U.S. Patent No. 2,738,581, frequently include a handle to which is fixedly connected a blade having two parallel cutting edges, the forward and rear ends of which provide four cutting corners. As each cutting corner becomes successively blunted, the blade is detached from the tool and is replaced in a fresh orientation to present a new corner in the cutting position. In use for the purposes described above, the corners of the blade may become blunted fairly rapidly, and, in these circumstances, an appreciable amount of time may be lost in performing the necessary operations of blade detachment, reorientation, and reattachment required.

For these and other reasons there presently exists a real reason for a hand cutting tool of the replaceable blade type wherein a fresh cutting corner may be provided whenever necessary with a minimum loss of time or inconvenience to the user.

SUMMARY OF THE INVENTION

It is therefore a principal object of the invention to provide a hand cutting tool utilizing replaceable cutting blades wherein the amount of time lost in replacing blunted blade portions is effectively minimized.

It is a further object of the invention to provide a hand cutting tool utilizing a plurality of cutting blades wherein one cutting blade at a time may be selected for cutting use with great rapidity.

It is another object of the invention to provide a hand cutting tool utilizing a plurality of blades wherein the blades may be oriented to bring their successively utilized cutting corners into cutting position without requiring removal of the blade from the tool.

One preferred embodiment of the invention intended to accomplish the foregoing objects includes a hand cutting tool having a handle adapted to be grasped by a human hand and a blade holder for holding a plurality of replaceble, thin, flat cutting blades. Each of the blades is of the type including two cutting edges, two parallel side surfaces and a centrally positioned closed slot. The blade holder includes cooperating generally coextensive, first and second jaw members having first and second surfaces respectively disposed in spaced facing relation for relative motion in directions generally perpendicular to the surfaces. These surfaces define a channel adapted to receive the blades in stacked, side-by-side relation extending longitudinally of the channel.

Abutment means are fixedly connected with the jaw members adapted to abuttingly contact portions of the blades to prevent transverse rotational movements thereof relative to the channel. Releasable first connecting means fixedly connect the first and second jaw members to clamp the blades firmly in the channel. The first connecting means, upon partial release thereof, permits each of the blades to be selectively, separately advanced longitudinally outwardly of the channel into a cutting position. Second connecting means are provided for fixedly connecting at least one of the jaw members with the handle.

Additionally, the connecting means permits the plurality of blades to be rotated through about 180° relative to the handle so that after the forward ends of the cutting edges have become blunted, the sharp rearward ends of the cutting edges then may be brought to the forward end of the tool for cutting purposes.

THE DRAWINGS

The preferred embodiment of the invention is illustrated in the accompanying drawings in which:

FIG. 1 is an exploded perspective view of a hand cutting tool according to the preferred embodiment of the invention;

FIG. 2 is a side view of the hand cutting tool shown in FIG. 1, with one blade shown in an extended position;

FIG. 3 is a top view of the hand cutting tool shown in FIG. 2;

FIG. 4 is a cross-sectional view of a portion of the hand cutting tool shown in FIG. 3, taken along the line 5—5 therein.

FIG. 5 is a cross-sectional view of a portion of the hand cutting tool shown in FIG. 3, taken along the line 5—5 therein.

DETAILED DESCRIPTION OF THE PREFERRED EMBODIMENT

Referring to FIG. 1 of the drawings, a preferred embodiment of the invention there shown comprises a hand tool having a generally suitable handle 2 configured to fit comfortably within a user's hand. The handle 2 is connected by an axially extending shaft 4 to a blade holder generally designated as 6.

The blade holder 6 includes first and second jaw members 8 and 10 comprising two generally coextensive plates, preferably substantially flat, disposed in parallel spaced relation to define a channel 12 extending longitudinally between the jaw members. A plurality of replaceable, thin cutting blades 14, disposed in stacked, side-by-side relation are received within the channel 12, extending longitudinally thereof. The blades 14 are of the type each having opposite longitudinally extending cutting edges 16 and 18 and a centrally positioned, longitudinally extending closed slot 20. Additionally, certain of the slotter blades 14 may be provided with differently configured edges, such as hooked, slanted or circular edge portions adapted for specialized cutting functions. Thus separate ones of the blades 14 may be advanced at various times from the stack of blades, to perform particular cutting tasks.

The first jaw member 8 is additionally provided with two longitudinally extending, transversely spaced edge flanges 22 facing towards and overlapping the edges 16 and 18 of the blades and the longitudinal edges of the jaw member 10 to prevent rotational and transverse motion of the blades 14 within the channel 12. The first jaw member 8 is made of a material relatively softer than the blades 14 (such as, for example, aluminum or plastic) to avoid blunting of the blade cutting edges by the flanges 22.

The jaw members 8 and 10 are clamped together to hold the blades firmly within the channel 12 by a wing screw 24 having a shank 25 passing through aligned centrally positioned apertures 26 and 28 in the first and second jaw members 8 and 10 respectively and through the slots 20 in the blades. The wing screw 24 engages a threaded aperture 30 provided in the shaft 4 to clamp the jaw members and blades firmly against an adjacent surface provided on the shaft 4.

To prevent rotation of the jaw members 8 and 10 and of the blades relative to the shaft 4 about the wing screw 24, a short projecting pin 36 is fixedly secured to the flat face of the shaft 4 extending perpendicularly outwardly therefrom. The pin 36 is aligned with the threaded aperture 30 and spaced forwardly therefrom. The pin 36 passes through aligned pin receiving apertures 38 and 40 provided in the first and second jaw members 8 and 10, respectively, and through the slots 20 of the blades to prevent rotation of these various members about the threaded wing screw 24.

As an additional function, the pin 36 abuts the forward ends of the closed slot 20 of the blades in a nonuse position thereof to locate the blades longitudinally entirely within the confines of the channel 12 so that the previously mentioned flanges on the first jaw member 8 prevent the blades from coming into contact with anything to which they might cause harm or which might cause damage to the blades.

The first and second jaw members 8 and 10 are also provided with rearwardly positioned, pin receiving apertures 42 and 44, respectively, positioned radially symmetrically on an opposite side of the wing screw 24 from the forward pin receiving apertures 38 and 40.

A pair of conventional flat wing portions extend outwardly from the head of the threaded portion of the wing screw 24 and are adapted to be grasped by using the fingers to thread or unthread the wing screw. The other end of the threaded portion engages the previously mentioned threaded aperture 30 in the shaft 4. When the wing screw 24 is tightened to a fully closed position, the threaded part 25 abuttingly engages the jaw member 10 to clamp the blades 14 and the jaw member 8 firmly against the handle. The jaw member 10 is a relatively hard material, such as steel, in order to prevent it from becoming gouged by the repeated tightening of the wing screw 24.

The interengaging threaded portions of the wing screw 24 and the threaded aperture 30 are of a length permitting unthreading of the interengaging portions without a complete separation of them to a sufficient extent to permit the jaw member 8 to be moved sufficiently away from the shaft 4 for the forward pin receiving aperture 38 to be separated from the pin 36. At this time, the jaw members 8 and 10 and the blades 14 may be rotated in unison through 180° to advance the rearward ends of the blades to the forward end of the tool to provide a fresh, sharp set of cutting corners. The wing screw 24 is then retightened to engage the projection 36 with the pin receiving apertures 42 and 44 in the jaw members and with the slots 16 in the blades, the rearward ends of which are now in the forward position.

In operation with the tool initially provided with a set of unused cutting blades disposed in a nonuse position concealed within the channel 12, the wing nut is first partially unloosened to loosen the blades 14, one of which is selectively advanced either by grasping it manually, shaking it downwardly or by other conventional manner. The advanced blade continues to move out of the tool until the rear end of its slot 16 abuts the threaded portion 25 of the wing screw. At this time, the wing screw is retightened and cutting is commenced, using initially the forward lower corner of the blade to cut into the surface of suitable work material. As the forward lower corner becomes blunted, the tool handle 2 is rotated about its axis through 180° in the operator's hand to bring the other cutting corner of the blade into the cutting position.

As that corner in turn becomes blunted, the wing screw is again loosened, the blade 14 is slid back and a fresh blade advanced in the manner previously described. After the forward ends of all of the blades 14 have become blunted, the wing screw 24 is then unthreaded to a sufficient extent to permit the jaw member 8 to be moved away from the shaft 5 to a sufficient extent to clear the pin 36 from the forward pin-receiving aperture 38. Both the jaw members and the blades are then rotated in unison through 180° to bring the rearward ends of the blades to the forward position and to align the rearward pin receiving apertures 42 and 44 with the pin 36. The wing screw 24 is then partially retightened to engage the pin 36 with the apertures 42 and 44.

Then one of the blades 14 is advanced, after which the wing screw 24 is fully tightened and cutting proceeds in the manner previously described. It will be seen that in this manner all corners of each of the blades 14 may be used without requiring at any time complete detachment of any of the blades from the tool. In this way a complete set of the blades can be used with only a minimum amount of lost time expended in changing the orientation of the various blades as the separate cutting corners of the various blades become successively blunted.

It will be appreciated that certain obvious modifications may be made. For example, the pin 36 may be located on the jaw member 8 with the appropriate pin receiving apertures provided in the shaft 4. Similarly, the wing screw 24 may have the head 52 abutting the remote side of the shaft 4 with a threaded portion engaging a threaded aperture provided in the jaw member 10.

In constructing a hand cutting tool according to the present invention, certain important advantages are provided.

In particular, the use of a blade holder adapted to contain a plurality of blades, each of which may successively be slid to the cutting position, provides substantial reduction of the time lost in performing blade changes when they become blunted.

Also particularly important is the provision of a blade mounting which permits the blades to be rotated about the mounting to bring their rearward ends to a forward cutting position after blunting of the forward ends. In this connection, it is significant to note that this reorientation is performed without any necessity of complete detachment of either the blades or the jaw members from the tool.

Other significant advantages are provided by the edge sides on one of the jaw members which completely conceal the blades in their nonuse position to prevent danger from the cutting edges and also to protect the cutting edges from accidental harm when they are not in use.

I claim:

1. In a hand cutting tool having a handle, a blade holder for holding a plurality of replaceable, thin cutting blades of the type including two cutting edges, and a centrally positioned, closed slot, said blade holder comprising:
cooperating, generally coextensive first and second jaw members, said jaw members including:
first and second surfaces respectively disposed in spaced opposed relation for relative motion in directions generally perpendicular to said blades, said surfaces defining a channel therebetween adapted to receive the blades in stacked, side-by-side relation extending longitudinally of said channel;
abutment means connected with said first and second jaw members adapted to abuttingly contact portions of the blades to prevent transverse and rotational movements thereof relative to said channel,
releasable first connecting means fixedly connecting the first and second jaw members to clamp the blades firmly in said channel, said first connecting means upon partial release thereof permitting each of the blades to be selectively, separately advanced longitudinally outwardly of said channel into a cutting position; and
second connecting means adapted to fixedly connect at least one of said jaw members with the handle.

2. A blade holder as defined in claim 1, wherein said first connecting means includes,
a longitudinally extending shaft adapted to be fixedly secured to the handle extending axially therefrom,
an elongated connector passing through aligned apertures in said jaw members, in said shaft and through the slots in the blades, said connector at one end thereof and said shaft having,
releasable interengaging threaded portions;
said connector at the other end thereof having,
an enlarged head portion abutting the other of said jaw members on a side thereof remote from said channel.

3. A blade holder as defined in claim 2, wherein said second connecting means includes:
an axially-extending base surface on said shaft adjacent a free axial extremity thereof, said base surface abuttingly contacting said one of said jaw members on a side thereof remote from said channel.

4. A blade as defined in claim 3 further including,
an outwardly extending projection on one of said shaft and said one of said jaw members,
at least one aperture in the other of said shafts and said one of said jaw members, said aperture receiving said projection to prevent rotation of said one of said jaw members about said connector relative to said shaft.

5. A blade holder as defined in claim 3 further including,
at least two of said apertures spaced radially symmetrically on opposite sides of said connector,
said interengaging threaded portions being of a length permitting unthreading of said interengaging portion without complete separation thereof to a sufficient extent to permit said projection to be withdrawn completely from the receiving one of said apertures so that said jaw members may be rotated about said connector to permit said projection to be aligned for entry into the other said apertures.

6. A hand cutting tool comprising a handle, a blade holder on one end of the handle, a plurality of elongated blades in side-by-side relation in the holder and each having a cutting edge at an end thereof, each of the blades having a slot therein extending longitudinally thereof and being slidable lengthwise of the holder independently to move the cutting edge thereof to an extended cutting position and to be retracted in the holder, said blade holder having portions at the lateral edges thereof overlapping the edge portions of the blades in retracted positions and extending lengthwise thereof, guide means extending through the slots of the blades to hold the blades aligned with the handle, and connecting clamp means extending through the blade slots and connected with the holder for holding the extended blade in a cutting position.

References Cited

UNITED STATES PATENTS

| | | | |
|---|---|---|---|
| 2,172,072 | 9/1939 | Rothschild | 30—158 |
| 2,131,358 | 9/1938 | Rothschild | 30—125 |
| 2,366,599 | 1/1945 | Curry | 30—34 |
| 2,698,482 | 1/1955 | Aguirregaviria | 30—40 |
| 2,821,724 | 2/1958 | Wurgaft | 7—15 |
| 3,045,348 | 7/1962 | Dunga | 30—304 |
| 2,098,641 | 11/1937 | Cook | 30—293 |

ROBERT C. RIORDON, Primary Examiner

J. C. PETERS, Assistant Examiner

U.S. Cl. X.R.

30—304, 332, 339